United States Patent Office 3,584,021
Patented June 8, 1971

3,584,021
PROCESS FOR COBALT COMPLEXES PRODUCTION
Giacomo Costa and Giovanni Mestroni, Trieste, Italy, assignors to Snam Progetti S.p.A., Milan, Italy
No Drawing. Filed June 21, 1968, Ser. No. 738,846
Claims priority, application Italy, June 22, 1967, 17,525/67
Int. Cl. C07f 15/06
U.S. Cl. 260—439R  9 Claims

ABSTRACT OF THE DISCLOSURE

A process is disclosed for producing an organometallic tetradentate complex of cobalt by reacting an organometallic tetradentate complex of cobalt of the formulae:

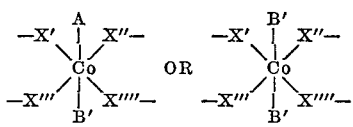

wherein X', X'', X''' and X'''', which form the tetradentate complex may be the same or different and each represents a nitrogen, oxygen, sulfur or phosphorus atom, A is a monovalent anion and B' is a Lewis base with a small unsaturated molecule and an active hydrogen compound having the formula R'H, said R' being an oxyaliphatic, oxyaromatic, oxyalkylaromatic, oxycarbocyclic, oxyeterocyclic, aminoaliphatic, aminoaromatic, hydroxy or mercapto radical.

---

This invention relates to a process for producing organometallic cobalt complexes useful in organic syntheses from non-organometallic cobalt complexes.

Organometallic cobalt complexes with polydentate chelating agents are well known.

We have now found that the addition is also possible for cobalt complexes which are not organometallic compounds, i.e., they do not posses a direct metal-carbon bond.

According to the present invention, there is provided a process for producing an addition compound of an organometallic complex of cobalt with a polydentate chelating agent having in the molecule a group having the following general formula:

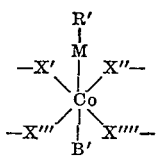

wherein X', X'', X''' and X'''', which may be the same or different, each represent a nitrogen, oxygen, sulphur or phosphorus atom; M represents a small unsaturated molecule; R' represents a radical of an active hydrogen compound having the formula R'H; and B' represents a Lewis base, which process comprises reacting a cobalt complex having no direct cobalt-carbon bond and having in the molecule a group having one of the two following general formulae:

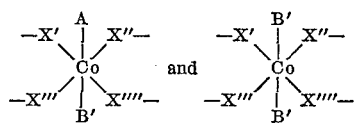

wherein X', X'', X''', X'''' and B' are as hereinbefore defined and A is a monovalent anion, with a small unsaturated molecule having the formula M and with either the active hydrogen compound having the formula R'H or an alkali metal derivative thereof represented by the formula MeR' wherein Me is an alkali metal atom, so as to produce the desired product.

The reaction may be effected at room temperature and at atmospheric pressure. An example of the small unsaturated molecule which may be employed in the present invention is carbon monoxide.

The active hydrogen compound may be, for example, an aliphatic, aromatic, alkyl aromatic, carbocyclic or eterocyclic alcohol, an aliphatic or aromatic amine, water or a mercaptan.

An example of the way in which the process of the present invention may be considered to proceed is illustrated by the following scheme:

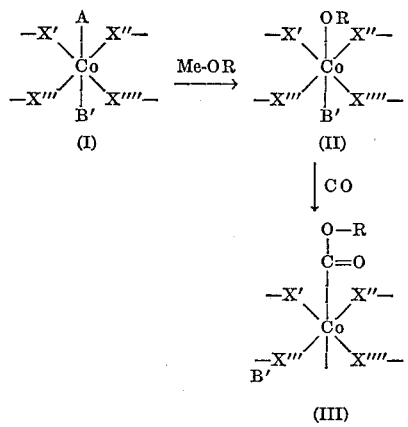

wherein X', X'', X''', X'''', A, Me and B' are as hereinbefore defined; CO represents carbon monoxide; and R represents a hydrocarbon radical.

This reaction is easily carried out at room temperature and at atmospheric pressure in the presence of a suitable solvent medium. The latter may be, for example, the active hydrogen compound R'H, an ether or a cyclic ether; it is also possible to use, for example, tetrahydrofuran, or the hydroxyalkyl or hydroxyaryl compound HOR corresponding to the MeOH reagent used in the above mentioned scheme. Water may also be used if it allows the preparation of the reagent MeOR from MeOH and HOR. A mixture of solvents may also be employed.

Some examples of a mixture of solvents are: tetrahydrofuran-hydroxyalkyl compound, tetrahydrofuran-hydroxyaryl compound, and tetrahydrofuran-water, providing that the last allows the preparation of the MeOR compound.

One compound which may be produced by a preferred process of the present invention is a carboxyalkyl cobalt compound, which is a suitable intermediate in organic syntheses. The starting material is a non-organometallic compound of cobalt and the process has the following advantages compared with the prior art:

(1) the preparation of the initial organometallic compound is no longer required, and the avoidance of this step reduces the total cost of the process;
(2) The use of radiation is no longer required, nor is the thermal energy for increasing the temperature or the mechanical energy for compressing gases; and
(3) shorter reaction times may be used.

These considerations refer to the preferred embodiment of the invention.

An example of a suitable monovalent anion A is a halide ion, and examples of suitable Lewis bases include an ether, water, an amine and a phosphine.

As a matter of fact, it is possible to effect the process under pressure or at an increased temperature, or by using radiation in order to improve the reaction course in accordance with known or easily derivable procedures.

The cobalt complexes prepared according to the procedure disclosed herein are described and claimed in copending application Ser. No. 705,906, filed Feb. 16, 1968 and having a common assignee.

The invention will now be illustrated by the following example:

EXAMPLE

A solution of 0.600 g. Br-Co (Salen) TPP (TPP=triphenylphosphine; salen=bis-salicyaldehydeethylenediiminate) in methanol was reacted at room temperature and atmospheric pressure with the stoichiometric amount of sodium methoxide to produce a brown solution of

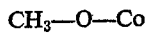

(salen) TPP. By bubbling carbon monoxide through this solution at room temperature, or by saturating the solution with carbon monoxide, the quick formation of a yellow-orange solution was observed. When this solution was poured into 10 ml. of water and the methanol evaporated, a yellow-orange precipitate was obtained, filtered and washed with ether. The resulting solid corresponded to the formula:

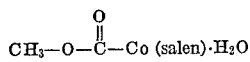

What we claim is:
1. Process for producing an organometallic complex of cobalt having the formula:

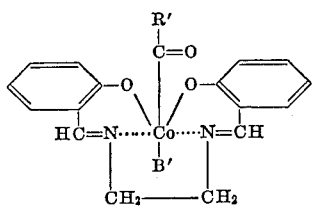

wherein R' is alkoxy and B' is a Lewis base selected from the group consisting of a phosphine, an ether and water which comprises reacting a cobalt complex of the formula:

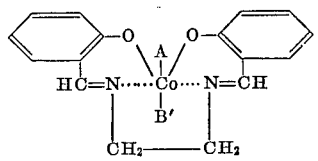

wherein B' is as defined above and A is a halide ion with carbon monoxide and an active hydrogen compound having the formula R'H or an alkali metal derivative thereof, said R' is as defined above, so as to produce the desired product.

2. A process according to claim 1 wherein R' is methoxy.
3. A process according to claim 1 wherein B' is water.
4. A process according to claim 1 wherein B' is triphenylphosphine.
5. A process according to claim 1 wherein A is bromo.
6. A process according to claim 1 wherein the reaction is effected in a solvent.
7. A process according to claim 6 wherein said solvent is an alcohol.
8. A process according to claim 7 wherein said solvent is R'H, R' is as defined above.
9. A process according to claim 1 wherein the reaction is effected at room temperature.

References Cited
UNITED STATES PATENTS
2,508,490   5/1950   Calvin et al. _____ 260—439

OTHER REFERENCES
Dolphin et al.: Chem. Communications, 1965, No. 20, pp. 494–5.

TOBIAS E. LEVOW, Primary Examiner
A. P. DEMERS, Assistant Examiner